United States Patent [19]  
Imataki et al.

[11] Patent Number: 5,073,101  
[45] Date of Patent: Dec. 17, 1991

[54] INFORMATION RECORDING MEDIUM, PRODUCTION PROCESS AND MOLDING DIE FOR SUBSTRATE THEREFOR

[75] Inventors: Hiroyuki Imataki; Mizuho Hiraoka, both of Kawasaki; Tomoyuki Tamura, Yokohama; Tetsuya Satoh, Kawasaki, all of Japan

[73] Assignee: Canon Kabushiki Kaisha, Tokyo, Japan

[21] Appl. No.: 544,652

[22] Filed: Jun. 27, 1990

Related U.S. Application Data

[62] Division of Ser. No. 301,145, Jan. 25, 1989, Pat. No. 4,956,214.

[30] Foreign Application Priority Data

Jan. 25, 1988 [JP] Japan .................................. 63-15237

[51] Int. Cl.$^5$ .............................................. B29C 43/02
[52] U.S. Cl. ...................................... 425/385; 425/810
[58] Field of Search ................ 369/275, 280; 425/810, 425/385; 264/107, 293

[56] References Cited

U.S. PATENT DOCUMENTS 4,481,620 11/1984 Murakami ....................... 369/275.1
4,482,511 11/1984 Komatsubara ..................... 425/810
4,723,903 2/1988 Okazaki ............................ 425/385

FOREIGN PATENT DOCUMENTS 2036410 6/1980 United Kingdom ............. 369/275.1

Primary Examiner—Willard Hoag
Attorney, Agent, or Firm—Fitzpatrick, Cella, Harper & Scinto

[57] ABSTRACT

A molding die for an information recording medium substrate having a prescribed unevenness pattern comprising a track portion and an information pit portion which has a planar shape of a polygon wherein at least one diagonal is substantially parallel to the track portion. Such molding die provides an information recording medium substrate without lack in the periphery of a pre-format.

5 Claims, 3 Drawing Sheets 5,073,101

INFORMATION RECORDING MEDIUM, PRODUCTION PROCESS AND MOLDING DIE FOR SUBSTRATE THEREFOR

This application is a division of application Ser. No. 301,145, filed Jan. 25, 1989, now U.S. Pat. No. 4,956,214.

FIELD OF THE INVENTION AND RELATED ART

The present invention relates to an information recording medium, particularly one for optical data recording and reproduction, a process for producing the substrate therefor, and a molding die for the substrate.

In the substrate for an information recording medium, a pre-format such as guide groove for auto-tracking and information pit is formed on the information recording surface thereof. In order to form such substrate, there have been used an injection molding process or hot pressing process wherein the pre-format pattern of a molding die is transferred to the substrate, in the case of a substrate comprising a thermoplastic resin.

Further, there have been known a so-called "2P" (Photopolymerization) process or a casting (or cast molding) process. In the 2P process, a photo-curable (or photo-hardenable) resin composition is applied onto a transparent resin plate comprising a thermosetting resin or thermoplatic resin, the resultant substrate is caused to closely contact a molding die, and radiation rays such as ultraviolet rays and X rays are uniformly supplied thereto from the transparent resin plate side to cure or harden the above-mentioned photo-curable resin composition, whereby the pattern of the molding die is transferred to the transparent resin plate.

On the other hand, in the casting process, there is used a molding die wherein an unevenness pre-format pattern corresponding to a guide groove 1 for auto-tracking or an information pit 2 has been preliminarily formed as shown in FIG. 6. Such pre-format pattern is directly formed on a substrate such as glass plate or metal plate, or is formed by forming a thin film such as metal film on a substrate and then forming an unevenness pre-format pattern thereon. In the casting process, opposite to such cast molding die, a smooth glass plate as a mirror die is disposed by the medium of a spacer to obtain a device for cast molding. Then, a monomer for resin, or prepolymer containing a solvent, etc., is poured into the device and then cured to obtain an optical recording medium substrate.

The unevenness pre-format pattern of the molding die, which is used for forming the above-mentioned unevenness pre-format corresponding to an information pit of the information recording medium substrate, generally has a shape of square or rectangle as shown in FIG. 6. Further, such pre-format pattern of molding dies for the injection process, hot pressing process or 2P process, sometimes has a shape of circle or ellipse.

However, when an information recording medium substrate having an unevenness pre-format is formed by the above-mentioned various process by use of molding dies wherein the unevenness pre-format pattern having the above-mentioned shape corresponding to an information pit, the releasability of the substrate from the molding die poses a problem. As the pre-format pattern becomes minuter, stress concentration on the pre-format, particularly in the periphery of the information pit, based on the poor releasability is liable to cause a defect such as lack 7 or crack as shown in FIGS. 7 and 8.

On the other hand, the cast molding process can provide a somewhat smaller probability of defect occurrence as compared with other methods, because the poured material used therefor provides a viscosity such that it is low at the initial stage and is gradually increased, and therefore the stress is reduced. However, even in this method, the stress based on the curing shrinkage of the resin is concentrated on the pre-format, particularly in the periphery of the minute information pit, whereby a defect also occurs. Further, when an information pit of a circular or elliptic shape is formed, it is difficult to prepare a master having the corresponding circular or elliptic pattern for providing such information pit, or to uniformize the pattern shapes of the respective pits.

Such defect such as lack in the periphery of the pre-format, particularly that in the periphery of the information pit, causes a read impossibility or read error at the time of reproducing the pre-format signal, whereby the reliability of an information recording medium can be impaired. Accordingly, the occurrence of such defect becomes a serious obstacle to the production of an information recording medium having a high reliability.

SUMMARY OF THE INVENTION

An object of the present invention is to provide an information recording medium which has a high reliability and comprises a substrate therefor without lack in the periphery of a pre-format.

Another object of the present invention is to provide a process for producing an information recording medium which has a high reliability and comprises a substrate therefor without lack in the periphery of a pre-format formed on the substrate.

A further object of the present invention is to provide a cast molding die for providing an information recording medium substrate which has good pattern precision without lack in the periphery of a pre-format formed thereon.

According to the present invention, there is provided an information recording medium comprising a substrate having a prescribed unevenness pattern comprising a track and an information pit; the information pit having a planar shape of a polygon; at least one diagonal of the polygon being substantially parallel to the track.

The present invention also provides a molding process, comprising: providing a molding die having a mold surface with a prescribed unevenness pattern comprising a track portion and an information pit portion, the information pit portion having a planar shape of a polygon wherein at least one diagonal is substantially parallel to the track portion; supplying a molding material to the molding die so that it contacts the mold surface; molding the molding material in contact with the mold surface; and releasing the molding material from the molding die thereby to form a substrate for an information recording medium.

The present invention further provides a molding die for an information recording medium substrate having a prescribed unevenness pattern comprising a track portion and an information pit portion; the information pit portion having a planar shape of a polygon; at least one diagonal of the polygon being substantially parallel to the track portion.

In the present invention, the molding die for an information recording medium has an unevenness pre-format pattern wherein a portion corresponding to an information pit has a polygonal shape wherein at least one diagonal line is substantially parallel to a portion of the pre-format pattern corresponding to a track. Such unevenness pre-format pattern reduces the stress concentration in the periphery of the information pit based on poor releasability, whereby the occurrence of defect such as lack or crack in the periphery of the unevenness pre-format formed on the information recording medium substrate is suppressed.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
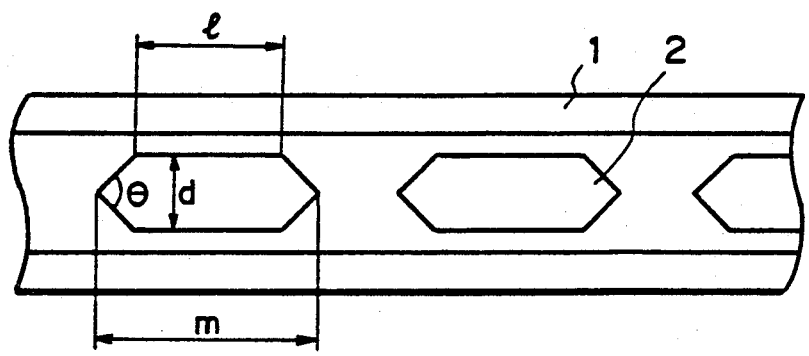
FIG. 1 is a schematic plan view showing an embodiment of the molding die for an information recording medium substrate according to the present invention.

Referring to FIG. 1 which is a schematic plan view of the molding die for an information recording medium according to the present invention, the molding die has a pre-format pattern 1 corresponding to a tracking for auto-tracking, and a pre-format pattern 2 corresponding to an information pit.

In the present invention, each of the pre-format pattern 1 for track and the pre-format pattern 2 for information pit generally comprises a projection or convexity, but can be an indentation or concavity.

Figure 2:
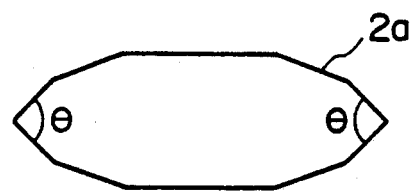
FIG. 2 is a schematic plan view showing another shape of an information pit constituting an unevenness pre-format of the information recording medium substrate according to the present invention.

On the other hand, FIG. 2 is a schematic plan view showing another shape of an information pit 2a constituting an unevenness pre-format of the information recording medium substrate according to the present invention.

Figure 3:
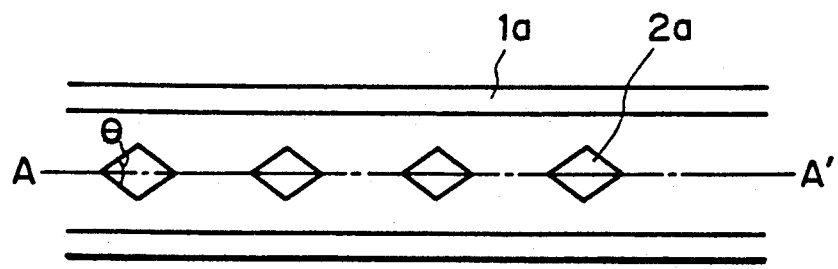
FIG. 3 is a schematic plan view showing an embodiment of the information recording medium prepared from the substrate therefor according to the present invention.

Further, referring to FIG. 3 which is a schematic plan view showing an embodiment of the information recording medium according to the present invention, the information recording medium comprises a track (such as tracking groove) 1a for auto-tracking, and an information pit 2a. In the present invention, the information pit 2a formed on the substrate and the pattern 2 of the molding die have a polygonal shape wherein at least one diagonal line is substantially parallel to the track 1a and the pattern 1 corresponding to the track, respectively.

In the present invention, the shape of the information pit 2a may preferably be a convex polygon. Further, the number of the vertices of the polygon may preferably be 4–20, more preferably 4–16.

Referring to FIG. 1, opposite angles $\theta$ corresponding to the diagonal (i.e., opposite angles corresponding to vertices connected by the diagonal) which is substantially parallel to the track are smaller than 180 degrees, and may preferably satisfy the relationship of 20 degrees $\leq \theta \leq 100$ degrees, more preferably 50 degrees $\leq \theta \leq 100$ degrees. These angles $\theta$ can be different from each other, but each of the values thereof many preferably be in the above-mentioned range.

The pit length m and pit width d may be designed corresponding to the processing system of a reproduction device used for reproducing the information pit. In general, the pit length (i.e., the dimension of a pit parallel to the track) m may preferably be 0.1–20 microns, particularly 0.2–10 microns, and the pit width (i.e., the dimension of a pit perpendicular to the track) d 0.1–20 microns, particularly 0.2–8 microns. Further, the depth of the information pit (i.e., in the case of the molding die, the height of the pre-format pattern corresponding to the information pit) may preferably be 3000 Å or smaller.

The length 1 of the side of the polygon disposed in parallel with the track can be zero. Further, the shape of the information pit may be another polygon as long as the tip or end of the information pit satisfies the above-mentioned condition with respect to $\theta$, and at least one diagonal line is substantially parallel to the tracking groove.

Incidentally, in the present invention, an error or tolerance corresponding to the spot diameter for a beam used for recording or reproduction (e.g., about 0.5–4 microns) is permissible. More specifically, with respect to the angle between the track and the diagonal substantially in parallel therewith, an angle of ±15 degrees or smaller is permissible, and an angle of ±8 degrees or smaller is preferred.

In the present invention, the information pit is caused to have a polygonal shape as described above, whereby a defect such as lack or crack which can occur in the pre-format, particularly in the periphery of an information pit, is suppressed when a minute unevenness pre-format is formed on a substrate by a molding process.

The present invention is particularly suitable when a spiral tracking groove for an optical disk preferably having the above-mentioned width and a pitch of 0.1–15.0 micron, more preferably 1.0–5 micron (particularly, about 1.6 micron); or parallel tracking grooves for an optical card preferably have the above-mentioned width and a pitch of 5–20 microns, more preferably 6–15 microns (particularly, about 12 microns) are formed on an information recording medium substrate.

The above-mentioned molding die according to the present invention may be prepared by using an ordinary photolithographic technique.

By using such molding die, an information recording medium substrate may be prepared by an ordinary procedure of known injection process, hot pressing process, 2P process or casting process. The production process may appropriately selected depending on the material used for the information recording medium substrate, but may preferably be a casting process.

Examples of the material for the information recording medium substrate may include: acrylic resins, epoxy resins, polycarbonate resins, unsaturated polyester resins, etc. Preferred examples of such material may include acrylic resins with little birefringence, and polycarbonate resins excellent in shock resistance.

Figure 4:
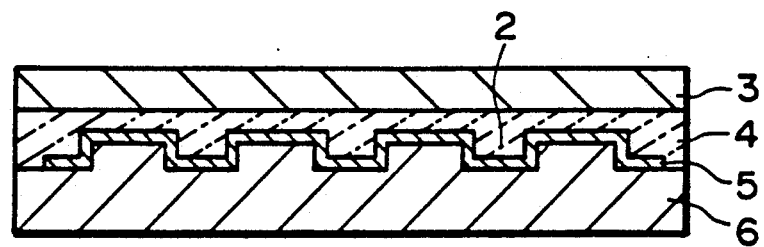
FIG. 4 is a schematic sectional view showing a cross section of the information recording medium shown in FIG. 3 taken on the line represented by A—A' in FIG. 3.

An information recording medium as shown in FIGS. 3 and 4 may be prepared by disposing a recording layer 5 on the unevenness pre-format surface of the thus obtained information recording medium substrate 6, and bonding a protective substrate 3 to the resultant substrate 6 by the medium of an adhesive layer 4. The thus obtained information recording medium has an unevenness pre-format comprising a polygonal information pit portion 2 which has been formed so that at least one diagonal of the polygon is disposed substantially in parallel with the track of the pre-format.

The optical recording layer used in the present invention may preferably be one which causes a change in optical characteristic, such as refractive index, reflectivity and transmittance, by irradiation of light for recording. Examples of such material for the recording layer may include: organic dyes such as polymethine dyes, cyanine dyes, anthraquinone dyes merocyanine dyes, and transition metal complexes (e.g., diamine-type metal complex, dithiol-type metal complex); derivatives obtained by introducing these dyes into a polymer; metals such as Bi, Te and alloys thereof; chalcogen-type compounds, etc.

The recording layer can also be a magnetic film wherein recording is effected by inverting magnetization by an magnetooptic effect such as Kerr effect or Faraday effect. Examples of the material for such magnetic film may include Tb-Fe-Co, Gd-Fe-Co, etc.

The recording layer may be formed by coating method, such as dip coating, spray coating, spinner coating, bar coating, blade coating, curtain coating, etc.; or by vapor deposition such as vacuum evaporation and sputtering.

The adhesive layer may comprise an adhesive including: e.g., vinyl acetate-type, vinyl acetate-acrylic type, vinyl acetate copolymer-type, vinyl acetate emulsion-type, acrylic-type, acrylate-type, acrylic copolymer-type, ethylene-type, ethylene-vinyl acetate-type, ethylene-vinyl acetate copolymer-type, polyethylene-type, methylene chloride-type, polyamide-type, polyamide-amine type, polyimide-type, urea-type, epoxy-type, epoxy-urethane type, epoxy-acrylic type, urethane acrylic-type, polyester-type, chloroprene-type, nitrile-type, nitrile rubber-type, urethane-type, vinyl urethane-type, polyurethane-type, olefin-type, cyanoacrylate-type, alkyl acrylate-type, vinyl chloride-type, phenolic resin-type, SBR (styrene-butadiene rubber)-type, polyol-type, synthetic rubber-type, emulsion-type, oligoester-type, cellulose-type, formaldehyde-type, ultraviolet-curing type, organic solvent-type, styrene-butadiene type, etc. It is also possible to use an adhesive which requires energy such as heat, light and electron beam, at the time of bonding, as long as such energy does not deteriorate the function of the optical recording material.

The protective substrate 3 may be composed of any material used for the purpose in ordinary optical recording media. Specific examples thereof may include: polyvinyl chloride, fluorine-substituted ethylene polymer, vinyl chloride-vinyl acetate copolymer, polyvinylidene chloride, acrylic polymers such as polymethyl methacrylate, polystyrene, polyvinylbutyral, acetylcellulose, styrene-butadiene copolymer, polyethylene, polypropylene, polycarbonate, epoxy resin, and acrylonitrile-butadiene-styrene copolymer, etc. As the case may be, a sheet of metal such as iron, stainless steel, aluminum, tin, copper or zinc, synthetic or natural paper, etc., can be used for this purpose. It is further possible to use various materials such as fiber reinforced plastics, composite comprising a plastic and metal powder including magnetic powder, and ceramics, corresponding to various uses. In addition, the material to be used for the transparent substrate can also be used for this purpose.

The information recording medium according to the present invention may be any of various forms such as optical card and optical disk.

As described hereinabove, according to the present invention, there is suppressed a defect such as lack or crack in the pre-format (particularly in the periphery of an information pit) of an information recording medium substrate which has an unevenness pre-format and is prepared by a molding process using a molding die.

Further, according to the present invention, it is possible to enhance the yield of the information recording medium substrate, to improve the reliability of the information recording medium prepared from the above-mentioned substrate, and to reduce the costs.

Hereinbelow, the present invention will be explained more specifically with reference to examples.

EXAMPLE 1

An information recording medium substrate was prepared by cast molding, and an information recording medium was prepared by using the substrate in the following manner.

First, a 3000 Å-thick chromium film was formed by vacuum evaporation on a 2.3 mm-thick glass plate, as a base material, having a mirror surface. Then, a positive-type photoresist (AZ-1350, mfd. by Hoechst Japan K.K.) was applied onto the chromium film by spin coating to form a 1000 Å-thick photoresist layer.

The thus formed photoresist layer was irradiated with light through a mask which had been formed corresponding to a prescribed pre-format pattern, and then developed with a developer liquid (AZ-312, mfd. by Hoechst Japan K.K.) to expose a prescribed portion of the chromium film disposed under the photoresist layer.

Figure 5:
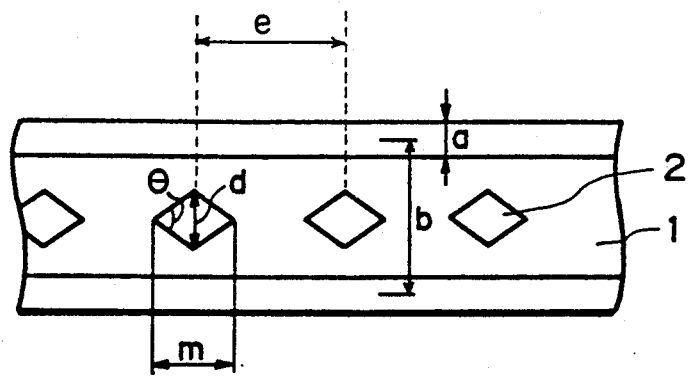
FIG. 5 is a schematic plan view showing the molding die prepared in Example 1 appearing hereinafter.

The pre-format pattern (corresponding to an optical card) used herein was one as shown in FIG. 5 wherein the width a of a tracking groove was 3 microns, the track pitch b was 12 microns. Further, in the information pit 2, $\theta = 60$ degrees, $m = 10$ microns, $d = 6$ microns and the pitch was 10 microns as shown in FIG. 5.

Then, the chromium film wherein a portion corresponding to the pre-format pattern had been exposed was etched by using 6N-hydrochloric acid until the base glass plate was exposed, and then sufficiently washed and dried. The residual photoresist was removed by ashing by use of an oxygen plasma ashing method, whereby a molding die having a pre-format pattern was obtained. The above-mentioned procedure was repeated to obtain 50 sheets of molding dies.

Opposite to the thus obtained molding die for casting, a 3 mm-thick glass plate with a mirror surface having the same size as the above-mentioned die was disposed by the medium of a spacer (thickness: 0.4 mm) to obtain a molding device for casting. Into the device, the following liquid resin composition was poured, cured at 100° C. for 10 hours, and then released from the die, thereby to obtain an information recording medium substrate.

| Resin Composition | |
|---|---|
| Methyl methacrylate | 70 wt. parts |
| Tertiary-butyl methacrylate | 25 wt. parts |
| Polyethylene glycol dimethacrylate (molecular weight: 620) | 5 wt. parts |

The above-mentioned molding process was repeated 100 times (i.e., 100 shots) to obtain 100 sheets of information recording medium substrates for an optical card of 85 mm×54 mm, with respect to each of the above-mentioned 50 molding dies.

Each of the thus obtained information recording medium substrates was examined with an optical microscope (magnification: 400) to observe a defect such as lack or crack in the periphery of the information pit constituting the pre-format, whereby the probability of occurrence of defects was determined. The thus obtained results are shown in Table 1 appearing hereinafter.

Each value shown in Table 1 is an average of probabilities of defect occurrence with respect to the respective substrates obtained from each of the dies. The probability of defect occurrence was determined in the following manner.

5,000 sheets of substrates having an unevenness pre-format were prepared by using 50 molding dies (100 shots with respect to each of 50 molding dies), and when one or more lack or crack occurred in the periphery of the unevenness pre-format of one substrate the substrate was defined as a defective substrate. Based on such examination, the probability of defect occurrence was calculated according to the following formula:

$$\frac{\text{(number of defective substrates)}}{\text{(number of prepared substrates)}} \times 100 \, (\%)$$

Thereafter, a 0.1 micron-thick layer of a cyanine-type dye (NK-1414, mfd. by Nihon Kanko Kenkyusho) was formed by spin coating on the surface having the unevenness pre-format of the information recording medium substrate obtained above, and then a 0.3 mm-thick protective substrate of polymethyl methacrylate was bonded thereto by the medium of an adhesive layer comprising an ethylene-vinyl acetatetype adhesive (hot-melt type, mfd. by Nirodine Co.) thereby to prepare an information recording medium.

EXAMPLE 2

Information recording medium substrates were prepared by cast molding in the same manner as in Example 1 except that information pits as shown in FIG. 1 having a shape as described below were formed:
$\theta = 90$ degrees
$m = 10$ microns
$l = 4$ microns
$d = 6$ microns,
pitch: 10 microns Each of the thus obtained information recording medium substrates was examined with an optical microscope (magnification: 400) to observe a defect such as lack or crack in the periphery of the information pit constituting the pre-format in the same manner as in Example 1, whereby the probability of occurrence of defects was determined. The thus obtained results are shown in Table 1 appearing hereinafter.

By using the substrate as obtained above, an information recording medium was prepared in the same manner as in Example 1.

COMPARATIVE EXAMPLE 1

Figure 6:
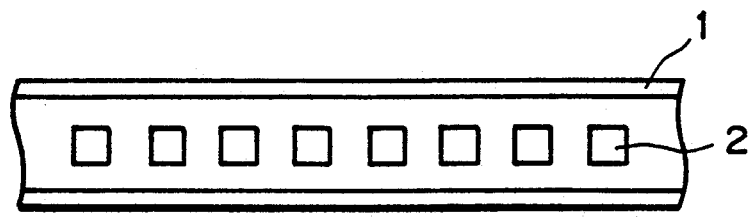
FIG. 6 is a schematic plan view showing a conventional molding die for an information recording medium.
Figure 7:
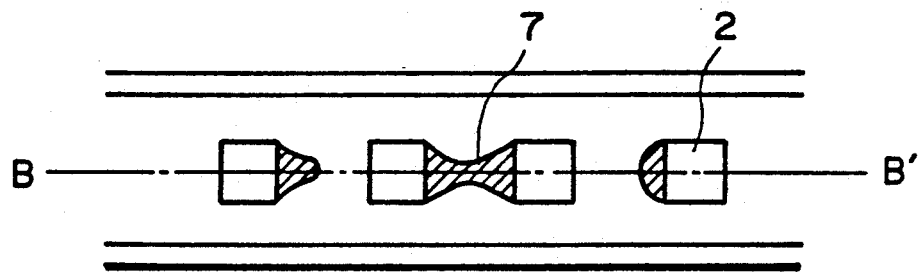
FIG. 7 is a schematic plan view showing a lack defect in the periphery of the information pit of a conventional information recording medium substrate.
Figure 8:
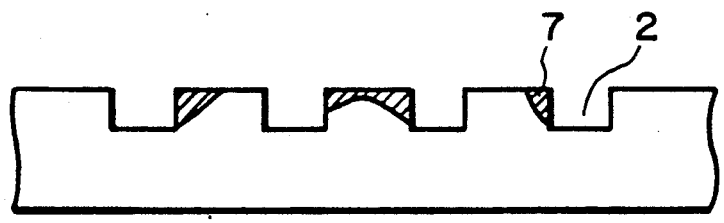
FIG. 8 is a schematic view showing a cross section of the information recording medium substrate shown in FIG. 7 taken on the line represented by B—B' in FIG. 7.

Information recording medium substrates were prepared by cast molding in the same manner as in Example 1 except that information pits having a square shape of 6×6 microns were formed as shown in FIG. 6.

Each of the thus obtained information recording medium substrates was examined with an optical microscope (magnification: 400) to observe a defect such as lack or crack in the periphery of the information pit constituting the pre-format in the same manner as in Example 1, whereby the probability of occurrence of defects was determined. The thus obtained results are shown in Table 1 appearing hereinafter.

By using the substrate as obtained above, an information recording medium was prepared in the same manner as in Example 1.

TABLE 1

| | Probability of defect occurrence |
|---|---|
| Example 1 | 14% |
| Example 2 | 15% |
| Comp. Example 1 | 50% |

EXAMPLE 3

An information recording medium substrate was prepared by compression molding in the following manner.

A 3000 Å-thick TiN film was formed by sputtering on a 2.3 mm-thick substrate (13×13 cm) of a super hard alloy (trade name: Microalloy, mfd. by Toshiba Tungalloy K.K.) having a mirror surface. The TiN layer thickness used herein was one corresponding to the depth of a prescribed pre-format pattern.

Then, a positive-type photoresist (AZ-1350, mfd. by Hoechst Japan K.K.) was applied onto the TiN film by spin coating to form a 1000 Å-thick photoresist layer.

The thus formed photoresist layer was irradiated with light through a mask which had been formed corresponding to a prescribed pre-format pattern, and then developed to expose a prescribed portion of the TiN film disposed under the photoresist layer.

The pre-format pattern used herein was similar to that Example 1. More specifically, as shown in FIG. 5, the width a of a tracking groove was 3 microns, the track width b was 12 microns. Further, in the information pit 2, $\theta = 60$ degrees, $m = 6$ microns, and the pitch e was 10 microns.

Then, the TiN film wherein a portion corresponding to the pre-format pattern had been exposed was subjected to dry etching thereby to expose the prescribed portion of the super hard alloy disposed under the TiN film.

| Dry etching conditions: |
|---|
| Device: Reactive ion beam etching device (trade name: ECR 310E, mfd. by Anelva Co.) |
| Etching gas: CF$_4$ |
| Degree of vacuum: 7 Pa |

-continued

Dry etching conditions:

RF discharge power: 150 W

The residual photoresist was removed by ashing by use of an oxygen plasma ashing method, whereby a die for compression molding having a pre-format pattern was obtained.

A compression molding device was constituted by using the thus obtained compression molding die. Then, a 0.4 mm-thick polymethyl methacrylate film was inserted into the device and was subjected to compression molding under the conditions of a maximum temperature of 120–130° C. and a maximum pressure of 100 kgf/cm$^2$ to transfer the unevenness pre-format pattern to one surface of the film, whereby an information recording medium substrate was obtained.

Each of the thus obtained information recording medium substrates was examined with an optical microscope (magnification: 400) to observe a defect in the periphery of the information pit in the same manner as in Example 1, whereby the probability of occurrence of defects was determined. The thus obtained results are shown in Table 2 appearing hereinafter.

By using the substrate as obtained above, an information recording medium was prepared in the same manner as in Example 1.

COMPARATIVE EXAMPLE 2

Information recording medium substrates were prepared by compression molding in the same manner as in Example 3 except that information pits having a square shape of 6×6 microns were formed as shown in FIG. 6.

Each of the thus obtained information recording medium substrates was examined with an optical microscope (magnification: 400) to observe a defect such as lack or crack in the periphery of the information pit in the same manner as in Example 1, whereby the probability of occurrence of defects was determined. The thus obtained results are shown in Table 2 appearing hereinafter.

By using the substrate as obtained above, an information recording medium was prepared in the same manner as in Example 1.

Incidentally, in the case of compression molding, the probability of defect occurrence in the above-mentioned substrate was increased, as the number of uses of the molding die (or the number of shots) became larger. Accordingly, the numbers of uses were classified into three cases wherein the number of uses was 0–100, 101–300, and 301–500, respectively. The probability of defect occurrence was determined with respect to the substrates obtained in each of the above-mentioned three cases.

TABLE 2

| Number of shots | Probability of defect occurrence | |
|---|---|---|
| | Example 3 | Comp. Example 2 |
| 0–100 | 0% | 50% |
| 101–300 | 12% | 70% |
| 301–500 | 17% | 89% |

What is claimed is:

1. A molding die for an information recording medium substrate having a prescribed unevenness pattern comprising a track forming portion and information pit forming portions; said information pit forming portions having a planar shape of a polygon; at least one diagonal of said polygon being substantially parallel to said track forming portion.

2. A molding die according to claim 1, wherein opposite angles of the polygon corners joined by said diagonal substantially parallel to the track forming portion are 20–100 degrees.

3. A molding die according to claim 2, wherein said opposite angles of the corners are 50–100 degrees.

4. A molding die according to claim 1, wherein said information pit forming portions having a length of 0.1–20 microns.

5. A molding die according to claim 1, wherein said information pit forming portions having a width of 0.1–20 microns.

* * * * *